(12) United States Patent
Law

(10) Patent No.: US 7,607,617 B2
(45) Date of Patent: Oct. 27, 2009

(54) WING UNIT, IN PARTICULAR SPAR BOX, FOR FORMING AERODYNAMICALLY ACTIVE SURFACES OF AN AIRCRAFT, IN PARTICULAR AIRFOILS, HORIZONTAL TAIL UNITS OR RUDDER UNITS OF A PLANE

(75) Inventor: Barnaby Law, Weyhe (DE)

(73) Assignee: Airbus Deutschland GmbH (DE)

( * ) Notice: Subject to any disclaimer, the term of this patent is extended or adjusted under 35 U.S.C. 154(b) by 568 days.

(21) Appl. No.: 11/316,126

(22) Filed: Dec. 22, 2005

(65) Prior Publication Data
US 2006/0226291 A1 Oct. 12, 2006

Related U.S. Application Data

(60) Provisional application No. 60/651,864, filed on Feb. 10, 2005.

(30) Foreign Application Priority Data
Dec. 22, 2004 (DE) .................. 10 2004 063 093

(51) Int. Cl.
*B64C 3/44* (2006.01)
(52) U.S. Cl. ..................................... 244/219
(58) Field of Classification Search ............... 244/218, 244/219, 46, 201, 123.1
See application file for complete search history.

(56) References Cited

U.S. PATENT DOCUMENTS

| | | | |
|---|---|---|---|
| 1,880,019 A | 9/1932 | Harmon | |
| 1,918,897 A | 7/1933 | Colburn | |
| 3,836,099 A | 9/1974 | O'Neill et al. | |
| 5,004,189 A | 4/1991 | Igram | |
| 5,433,404 A | 7/1995 | Ashill et al. | |
| 5,531,407 A | 7/1996 | Austin et al. | |
| 6,010,098 A | 1/2000 | Campanile et al. | |
| 6,070,834 A | * 6/2000 | Janker et al. | ................. 244/219 |
| 6,138,957 A | * 10/2000 | Nastasi et al. | ............... 244/219 |

(Continued)

FOREIGN PATENT DOCUMENTS

DE 1269497 5/1968

(Continued)

OTHER PUBLICATIONS

Greg Crieco:"Airplane Wing that change shape like a birds has scale like a fish-morphing wing photos"; Homepage Pensylvania State University; online: 3,Mai 2004; XP0023688602; www.psu.edu/ur/2004/morphwing.html (geffinden am 16.2.06).

(Continued)

*Primary Examiner*—Tien Dinh
(74) *Attorney, Agent, or Firm*—Lerner, David, Littenberg, Krumholz & Mentlik, LLP

(57) ABSTRACT

The invention relates to a wing unit, in particular a spar box for forming aerodynamically active surfaces of an aircraft, in particular airfoils, horizontal tail units, or rudder units of a plane.

Aerodynamic improvements can be obtained due to a surface geometry of the aerodynamically active surfaces, which surface geometry is adapted to the respective operating state of the plane by using the actuating members and/or weight savings due to minimizing of structural mechanical loads of the wing unit.

38 Claims, 3 Drawing Sheets

U.S. PATENT DOCUMENTS

| | | | |
|---|---|---|---|
| 6,227,498 B1 * | 5/2001 | Arata | 244/219 |
| 6,375,127 B1 * | 4/2002 | Appa | 244/215 |
| 7,461,820 B2 * | 12/2008 | Grove | 244/219 |

FOREIGN PATENT DOCUMENTS

| | | |
|---|---|---|
| DE | 19653851 | 6/1998 |
| DE | 19936721 | 2/2001 |
| FR | 2853881 | 10/2004 |
| GB | 15290 | 10/1916 |
| GB | 448249 | 6/1936 |
| GB | 472567 | 9/1937 |
| WO | 02/47976 A2 | 6/2002 |
| WO | WO 02/47976 A2 | 6/2002 |

OTHER PUBLICATIONS

Greg Crieco:"Airplane Wing that change shape like a birds has scale like a fish-morphing wing photos"; Homepage pensylvania state university; online: 3.Mai 2004; XP0023688603; www.spacedaily.comlnews/aerospace-04c.html; zitiert zum Beleg des technischen Inhalts (gefunden am 16.2.06).

Gillar J.:"Adaptronik:Innovative Loesungen aktiv Schwingungen die Schwingungen sind Gleich null"; Industrie Anzeiger; Leinfelden-Echterdingen, DE, Bd. 48/49, 1995, Seite 38-39. XP0009991561.

Office Action from corresponding German Application 10 2004 063 093, dated Feb. 2, 2009.

* cited by examiner

WING UNIT, IN PARTICULAR SPAR BOX, FOR FORMING AERODYNAMICALLY ACTIVE SURFACES OF AN AIRCRAFT, IN PARTICULAR AIRFOILS, HORIZONTAL TAIL UNITS OR RUDDER UNITS OF A PLANE

CROSS-REFERENCE TO RELATED APPLICATIONS

This application claims the benefit of the filing date of U.S. Provisional Patent Application No. 60/651,864 filed Feb. 10, 2005, the disclosure of which is hereby incorporated herein by reference.

BACKGROUND OF THE INVENTION

This invention relates to a wing unit, in particular a spar box, for forming aerodynamically active surfaces of an aircraft, in particular airfoils, horizontal tail units or rudder units of a plane, comprising an upper shell and a lower shell.

In aircraft construction, spar boxes form the wing unit as such for receiving all, substantial mechanical forces or loads occurring at aerodynamically active surfaces, in particular airfoils, rudder units, horizontal tail units, or the like.

Such spar boxes, e.g. for forming an airfoil, are formed amongst other things by a lower shell and an upper shell. The upper shell and the lower shell form the aerodynamically active surface as such, representing e.g. an airfoil section, a horizontal tail unit section, or a rudder unit section, or the like, of a plane. In addition, between the lower shell and the upper shell, a plurality of ribs are preferably uniformly spaced from each other, and arranged substantially in parallel to the longitudinal axis of the plane. Amongst other things, the ribs are for connecting the upper and lower shells as well as for further stiffening of the spar box. The ribs are respectively connected by their lower and upper rib feet to the corresponding inner surfaces of the lower shell and the upper shell, at least sectionwise. Substantially transversely to the longitudinal axis of the plane, and/or approximately in parallel to a front and/or rear edge of the airfoil, in addition, normally at least one spar extends between the upper and the lower shell. If an airfoil comprises for instance one front and one rear spar, then the front end regions of the ribs are at least sectionwise connected to the front spar, and the rear end regions of the ribs are at least sectionwise connected to the rear spar. Besides, the spars are connected at least sectionwise to the upper and lower shells. For further stabilizing the surfaces of the upper and lower shells, the latter in general further have so called stringers. The stringers are made as profiles that are preferably uniformly spaced from each other, arranged substantially transversely to a longitudinal axis of the plane and/or in parallel to a front or rear edge of an airfoil, at the inner surface of the upper and lower shell and connected thereto. The stringers can be formed e.g. as angle profiles or the like.

As a result of the almost all-round connection of the upper and lower shell, as well as of the ribs and spars to each other, a spar box thus constructed for forming an airfoil, a horizontal tail unit, a rudder unit, or the like, is capable of bearing high loads while having a comparatively low weight.

At the spar box of an airfoil, amongst other things, the landing gear, engine pods, takeoff and landing flaps, slats, spoilers and so called flaps are secured. In addition, an adequately sealed spar box can at the same time serve as a fuel tank for a plane. If the spar box is not completely sealed, e.g. tightly closing foil linings, so called liners, can be inserted into the spar box for receiving fuel or the like. However, regardless of its secondary features, the spar box main object is to introduce all forces acting on the airfoil through the airfoil root into the fuselage cell of the plane. Inversely, forces from the fuselage cell are introduced through the airfoil root into the spar boxes and thus e.g. into the airfoils.

Also, further aerodynamically active surfaces of an aircraft, e.g. horizontal tail units, rudder units, canard wings, and other control or tail surfaces have spar boxes for forming the load carrying structure.

In earlier spar boxes, all occurring forces are transmitted through the respective components of the spar box, in particular the upper shell, lower shell, spars, ribs, and stringers. For an airfoil, e.g. the upper and lower shells of the spar box substantially transmit the normal stresses resulting from the transverse force bending of the airfoil. In contrast, the ribs in the spar box are mainly loaded with transverse forces. Finally, the spars are mainly for transmitting shear stresses resulting from bending of the airfoil. This distribution of the different forces occurring inside an airfoil, horizontal tail unit, or rudder unit, over respectively different constructive elements has proven to be very effective for the lightweight structures required for aircraft construction.

Therefore, due to geometry and statics uniquely defined during constructive design, earlier spar boxes have preset bending and torsion under load.

By using fiber reinforced plastic materials it is possible to obtain, though in a limited way—due to their at least passively differentiating effect—a direction dependent bending/torsion coupling of a spar box, however, dynamic adaptability of the spar box to a plurality of different operating or loading states is not possible in this way.

In addition, in different loading states of a plane, e.g. respectively a defined bending/torsion coupling of the spar box shall be reached, in particular so as to improve the aerodynamic properties of the plane in a plurality of different operating states and/or to reduce the mechanical load of individual plane components.

SUMMARY OF THE INVENTION

There may be a need to provide an improved wing unit.

This need may be met by a wing unit with the characteristics of patent claim 1.

Due to the fact that in the region between the upper shell and the lower shell, at least one actuating member for modifying the surface geometry of the aerodynamically active surface and/or the mechanical properties of the wing unit is arranged, it may be possible e.g. to adapt the bending and torsion coupling of a spar box formed with the wing unit according to the invention, for creating an aerodynamically active surface in the best possible way, dynamically to different operating or loading states of an aircraft, in particular a plane, by a length variation of the actuating member or actuating members, monitored by a control and regulation device. Moreover, a surface geometry of the aerodynamically active surface may be adapted dynamically by the actuating member or actuating members to different operating states or loading states of the aircraft.

Diminishing the mechanical load of individual plane components may allow a statically lighter dimensioning thereof, which among other things results in weight savings. Such desired dynamical adaptability to different operating or loading states cannot be obtained with "rigid" spar boxes according to the prior art. By specifically driving the actuating members located inside the spar box according to the invention depending on current different operating states of the plane equipped therewith, e.g. an airfoil may react dynamically to all load types. According to the invention a spar box, for forming aerodynamically active surfaces of an aircraft, in particular airfoils, horizontal tail units or rudder units of a plane, may be provided that may be adapted dynamically to a plurality of different operating or loading states.

In accordance with a further exemplary embodiment of the wing unit, by using at least one actuating member, a surface geometry of the aerodynamically active surface can be varied, depending on loading states prevailing in the wing unit, by a control and regulation device. This embodiment may allow dynamic adaptation of the surface geometry of the aerodynamically active surface, e.g. of an airfoil of a plane, to different operating and loading states so that for instance the drag coefficient, and thus the fuel consumption, of the aircraft may be reduced.

In accordance with a further exemplary embodiment, by using at least one actuating member, a bending/torsion coupling of the wing unit can be varied by the control and regulation device depending on the loading states prevailing in the wing unit. Thereby, load reductions may be obtained at different operating and loading states of the aircraft, thereby possibly allowing amongst other things weight savings.

In accordance with an exemplary embodiment, at least one spar is arranged between the upper shell and the lower shell. This embodiment of the invention may allow for a constructively simpler design of the spar box according to the invention in comparison with a construction wherein both the ribs and the spars are replaced by actuating members.

In a further exemplary embodiment, it is provided for at least one rib to be arranged between the upper shell and the lower shell. This embodiment may also be to simplify the design of the spar box in comparison with a constructive solution wherein both the spars and the ribs are replaced by actuating members.

A further exemplary embodiment provides for the spar or spars at the actuating member or actuating members to be designed to be shear flexible. Thereby, undesired stresses in case of adjustment or length variation of the actuating members may be avoided.

In accordance with a further exemplary embodiment, it is provided for the rib or ribs at the actuating member or actuating members to be designed to be transverse force flexible. Thereby, also undesired stresses in case of adjustment of the actuating members may be avoided.

A further exemplary embodiment of the spar box provides for a length of at least one actuating member to be variable by the control and regulation device. By this embodiment, amongst other things, a dynamic adaptation of the bending/torsion coupling of the spar box according to the invention depending on a plurality of different operating and loading states of the plane may be possible.

According to a further exemplary embodiment of the wing unit, between two ribs, an actuating member is arranged, the actuating member being arranged substantially in parallel to the spar. This embodiment may allow for at least a slight adaptation of the wing unit to different loading and operating states with relatively reduced constructive expenditure.

A further exemplary embodiment provides for at least two actuating members for forming a tension shear field to be arranged crosswise between at least two ribs, with the actuating member or actuating members being arranged substantially in parallel to the spar or spars. Forming a tension shear field may allow greater tensile and/or shear forces to be generated in the wing unit with relatively small actuating distances of the actuating members and consequently may also allow a more flexible adaptation to different aerodynamic conditions and/or loading states. The crosswise arrangement of the actuating members between the ribs therefore may allow a spar to be replaced by the actuating members at least locally.

According to a further exemplary embodiment of the wing unit, an actuating member is arranged substantially in parallel to a rib in the region between the upper shell and the lower shell. This embodiment may allow for at least a slight adaptation of the wing unit to different loading and operating states with comparatively reduced constructive expenditure.

In accordance with a further exemplary embodiment of the wing unit for forming a spar box, the actuating member or actuating members are rod-shaped. Rod-shaped actuating members may advantageously be arranged in the spar box between adjacent ribs. In addition, rod-shaped actuating members may allow for constructively convenient integration of actuators, such as in the form of piezoelectric filaments or wires made of shape memory alloys.

A further exemplary embodiment of the invention provides for at least one actuating member to have at least one actuator for varying the length of at least one actuating member. With this embodiment, the length of the actuating members may be varied by f a control and regulation device. The actuating members may then be either shortened or lengthened so that both tensile and shear stresses may be generated.

In accordance with a further exemplary embodiment of the wing unit, at least one actuator is formed with at least one piezoelectric element, in particular with piezoelectric stacks, piezoelectric plates, piezoelectric filaments and/or at least one shape memory element, which can be operated through control signals generated by the control and regulation device. With the use of piezoelectric elements and/or shape memory elements, high efficiency may be possible regarding the actuating energy to be produced and the actuating distances be obtainable by this energy.

A further exemplary embodiment provides for at least one actuating member to have at least one sensor for detecting loading states in at least one actuating member and/or a length variation of at least one actuating member. Thereby, actuating members may be operated with greater differentiation by using the control and regulation device regarding different operating and loading states of the aircraft, because the control and regulation device may also take into account the current loading states and/or length variations of the actuating members.

According an exemplary embodiment a wing unit, in particular a spar box, for forming aerodynamically active surfaces of an aircraft, in particular airfoils, horizontal tails, or rudder units of a plane, is provided comprising an upper shell and a lower shell, wherein in the region between the upper shell and the lower shell, at least one actuating member for modifying the surface geometry of the aerodynamically active surface and/or the mechanical properties of the wing unit is arranged.

According to another exemplary embodiment in the wing unit by means of at least one actuating member, a surface geometry of the aerodynamically active surface can be modified by a control and regulation device, depending on the loading states prevailing in the wing unit.

According to another exemplary embodiment in the wing unit by means of at least one actuating member, a bending/torsion coupling of the wing unit depending on the loading states prevailing in the wing unit can be modified by the control and regulation device.

According to another exemplary embodiment in the wing unit between the upper shell and the lower shell, at least one spar is arranged.

According to another exemplary embodiment in the wing unit between the upper shell and the lower shell, at least one rib is arranged.

According to another exemplary embodiment in the wing unit the spar or the spars are designed to be shear flexible in the region of the actuating member or the actuating members.

According to another exemplary embodiment in the wing unit the rib or the ribs are designed to be transverse force flexible in the region of the actuating member or the actuating members.

According to another exemplary embodiment in the wing unit a length of at least one actuating member can be varied by means of the control and regulation device.

According to another exemplary embodiment in the wing unit between two ribs, one actuating member is arranged, wherein the actuating member is arranged substantially in parallel to the spar.

According to another exemplary embodiment in the wing unit between at least two ribs at least two actuating members for forming a tension shear are arranged crosswise, wherein the actuating member or actuating members are arranged substantially in parallel to the spar or spars.

According to another exemplary embodiment in the wing unit at least one actuating member between a lower rib foot of a rib and an upper rib foot of another rib, and at least one actuating member between an upper rib foot of the rib and a lower rib foot of the other rib are arranged crosswise.

According to another exemplary embodiment in the wing unit one actuating member is arranged substantially in parallel to one rib in the region between the upper shell and the lower shell.

According to another exemplary embodiment in the wing unit at least two actuating members are arranged crosswise substantially in parallel to at least one in the region between the upper shell and the lower shell for forming a tension shear field.

According to another exemplary embodiment in the wing unit the actuating member or actuating members are rod-shaped.

According to another exemplary embodiment in the wing unit at least one actuating member has at least one actuator for varying the length of at least one actuating member.

According to another exemplary embodiment in the wing unit at least one actuator is made with at least one piezoelectric element, in particular piezoelectric stacks, piezoelectric plates, piezoelectric filaments and/or with at least one shape memory element which can be operated through control signals generated by the control and regulation device.

According to another exemplary embodiment in the wing unit the control signals for driving the actuator or actuators are electrical voltages and/or electrical currents.

According to another exemplary embodiment in the wing unit at least one actuating member has at least one sensor for detecting loading states in at least one actuating member and/or a length variation of at least one actuating member.

According to another exemplary embodiment in the wing unit in the region of the upper shell, the lower shell, the spars, as well as the ribs, at least one sensor for detecting at least one loading state and/or at least one length variation in the region of the upper shell, the lower shell, of at least one spar, as well as of at least one rib is arranged.

According to another exemplary embodiment in the wing unit the sensor or sensors are formed with at least one piezoelectric element, in particular piezoelectric stacks, piezoelectric plates, piezoelectric filaments, strain gauges, or the like.

Further advantageous embodiments of the invention are described in further patent claims.

DETAILED DESCRIPTION

In the figures identical or similar elements are labeled with the identical or similar reference signs.

Figure 1:
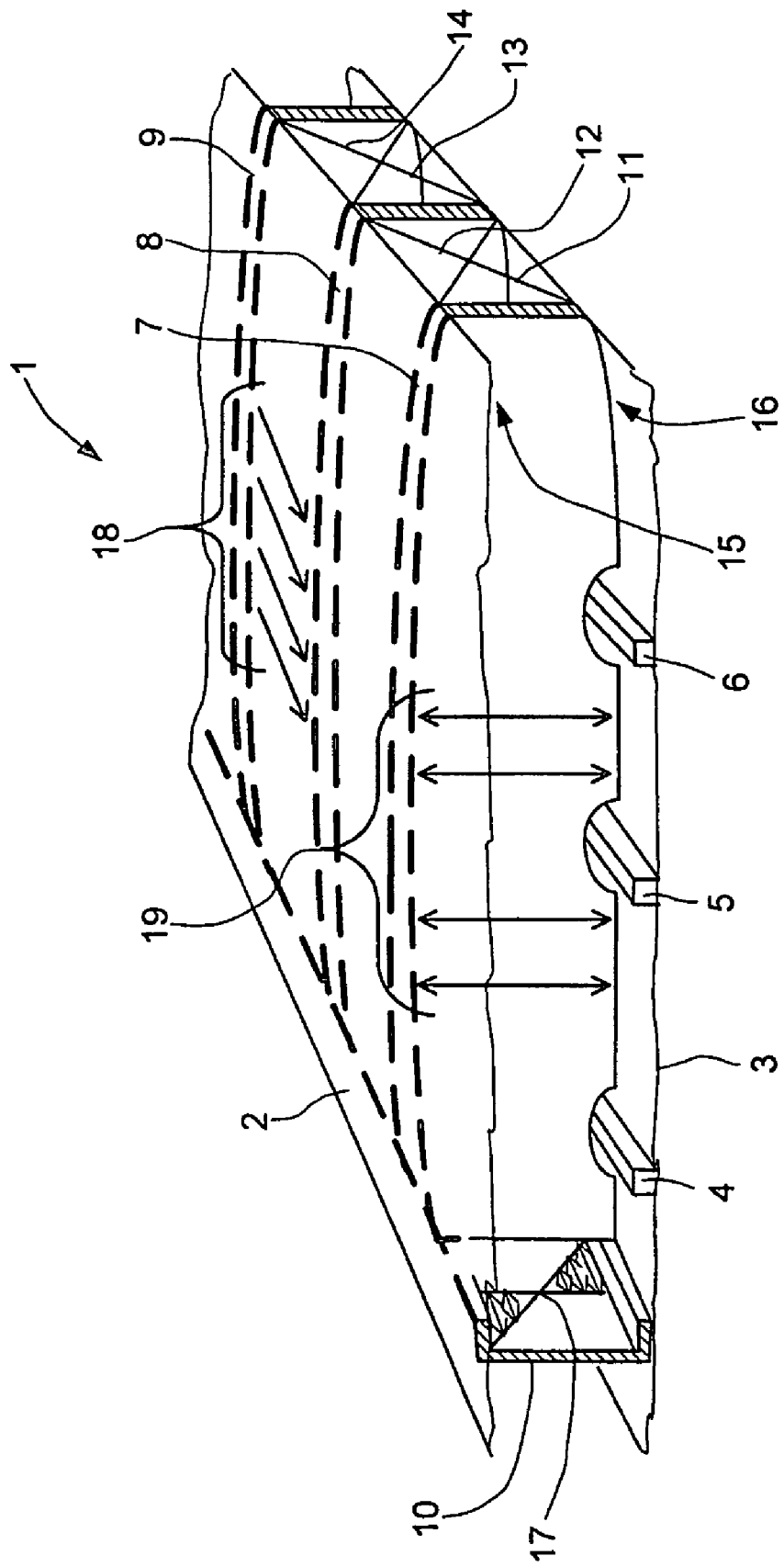
FIG. 1 shows a perspective illustration of one section of a spar box formed with the wing unit according to the invention for an airfoil according to a first exemplary embodiment.

FIG. 1 shows a perspective illustration of a section of a spar box formed with the wing unit according to the invention for an airfoil in accordance with a first exemplary embodiment, wherein the actuating members are integrated into the load carrying structure only sectionwise.

A wing unit configured as a spar box 1 forms a substantial component of an airfoil, not shown in detail, of an aircraft, in particular a plane. Herein, spar box 1 is only a small section of a complete spar box, which spar box is used for forming a wing unit of a plane, for example.

Spar box 1 has an upper shell 2 as well as a lower shell 3. The lower shell 3 is stiffened with stringers 4, 5, 6. The upper shell 2 also has correspondingly formed stringers, not shown in detail, for reinforcement. In particular, the stringers are meant for avoiding dents in the upper shell 2 and the lower shell 3 which only have a relatively low wall thickness.

The upper shell 2 and the lower shell 3 form the aerodynamically active surface of spar box 1 forming for instance an airfoil section of a plane. The spar box 1 shown in FIG. 1 forms at least one section of an airfoil of a plane, wherein at the front region, other components, not shown in detail, such as slats, are mounted. Correspondingly, at the rear region, spar box 1 comprises further components, also not shown in detail, such as for instance landing flaps.

In addition, between upper shell 2 and lower shell 3, three ribs 7, 8, 9 for forming and further stiffening of spar box 1 are arranged. Ribs 7, 8, 9 are at least locally connected to the upper shell 2 and the lower shell 3. In addition, spar box 1 comprises a front spar 10. Front spar 10 is connected to ribs 7, 8, 9 as well as to upper shell 2 and lower shell 3, at least locally. Correspondingly to front spar 10, spar box 1 comprises a rear spar which is not represented for the sake of improved clarity of the drawing. The rear spar is also connected to the end regions of ribs 7, 8, 9, upper shell 2 as well as lower shell 3, at least locally.

The mutual connection of the individual components of spar box 1 in the form of front spar 10, rear spar, ribs 7, 8, 9, upper shell 2, and lower shell 3, to each other, results in a construction that can bear high mechanical loads while still being lightweight. The connection of the individual components to each other can herein be done e.g. by riveting, welding, screw fitting, gluing, or the like. The individual components of spar box 1 can be formed from a metallic material, such as aluminum, aluminum alloys, titanium, and/or fiber reinforced plastic material, such as carbon fiber reinforced epoxy resin, or the like.

Between ribs 7 and 8, actuating members 11 and 12 are arranged crosswise. Correspondingly, between the ribs 8 and 9, the actuating members 13 and 14 are arranged. The crosswise arrangement of actuating members 11 to 14 ensures high actuating power with relatively small length variations and/or actuating distances of actuating members 11 to 14. Moreover, with crosswise arranged actuating members, both tensile forces and compressive forces can be established and introduced equally efficiently. Such a framework of crosswise arranged actuating members for forming a tension shear field is thereby capable of statically replacing or at least complementing surface components, such as ribs, plates, as well as spars.

Actuating members 11 to 14 are for instance rod-shaped actuators with respectively integrated piezoelectric elements which can generate and/or absorb both tensile and shear stresses. The actuators can be formed for instance as carbon fiber reinforced epoxy rods, in which the piezoelectric elements are directly embedded. The piezoelectric elements can be formed, for instance, like filaments, strings, piezoelectric stacks, plates, or the like. For generating greater tensile shear stresses, it is also possible to integrate shape memory alloys in the epoxy rods. The preferably crosswise positioned actuating members 11 to 14 constitute in their complete arrangement the tension shear field which at least locally takes over the function of the front spar 10 and/or of the rear spar, and/or at least complements the static functions thereof.

The piezoelectric elements and/or the shape memory alloys inside an actuating member can respectively be driven individually or in groups. Actuating members 11 to 14 can also be driven individually or groupwise by a control and regulation device not shown in detail. For this purpose, the control and regulation device generates adequate electrical control signals that are fed through connecting lines, not shown, to the actuating members 11 to 14. With the electrical control signals, a length of the actuating members 11 to 14 can be varied specifically, i.e. either lengthened or shortened. A specifically controlled length variation of the individual actuating members 11 to 14 creates tensile or shear stresses in the actuating members which stresses are transferred into the spar box 1.

Actuating members 11 to 14, front spar 10, rear spar, ribs 7, 8, 9, upper shell 2, lower shell 3, stringers 4, 5, 6, as well as further components, can moreover be fitted with sensors, not shown in detail, for detecting loading states, in particular mechanical stresses, and/or length variations in individual components. By using the sensors, mechanical loading states and/or length variations can be detected in nearly all components of the whole wing unit. The sensors are connected to the control and regulation device via connecting lines. The measuring signals determined by the sensors are transferred to the control and regulation device which determines therefrom control signals for actuating members 11 to 14 for driving them. With the sensors, a more precise dynamic adaptation of the wing unit formed with the spar box 1 according to the invention to different loading and operating conditions, e.g. of a plane airfoil formed therewith, is possible. Both the control and the measuring signals can be transmitted in multiplex operation via the same connecting lines.

The length variations of actuating members 11 to 14, monitored by the control and regulation device, generate mechanical stresses inside the wing unit forming spar box 1, which can be used e.g. for setting a defined bending/torsion coupling at different operating or loading states of an airfoil of a plane. Thus, when gusts occur, the spar box can first be made statically "more elastic", and when the gust has reduced, it can again be set statically "more rigid" by specific driving of the actuating members, so that mechanical load peaks can be minimized and/or completely avoided. This results in load reductions that lead to a more lightweight constructive version of the components with a corresponding reduction of weight.

With appropriate driving of actuating members 11 to 14, a wing unit formed with the spar box 1 according to the invention can moreover be adjusted in an aerodynamically efficient way, e.g. slightly twisted, lifted, or otherwise deformed as defined.

In particular, by specifically operating actuating members 11 to 14 a surface geometry of an airfoil of a plane can be modified at least locally (so called "morphing"), for example. Thereby, by using the control and regulation device the aerodynamic properties of an airfoil can be modified directly and dynamically, for example. Thus, it is possible, e.g. to provide an airfoil of a plane during the takeoff and landing phase by the adaptive spar box according to the invention with an optimal surface geometry for low velocity in blower stream, while during cruise, the airfoil is provided with a surface geometry optimized for higher flying speeds. Thus, an airfoil constructed with the spar box 1 according to the invention always has almost optimal properties, even under different operating or loading states, with simultaneously improved in-flight comfort.

In addition, the aerodynamic action of the landing flaps, spoilers, slats, ailerons, elevators, as well as rudders, can at least be supported by an adequate modification of the surface geometry of the corresponding aerodynamically active surfaces. Furthermore, flight maneuvers can be supported actively by the adaptive wing unit, or the spar box formed therewith, through a foresighted—e.g. because remote control sensors indicate gusts etc. in advance—modification of the surface geometries of aerodynamically active surfaces.

In the exemplary embodiment in accordance with FIG. 1, both ends of the actuating members 11 to 14 are respectively connected to upper and lower rib feet 15, 16 of ribs 7, 8, 9, as in these regions, there are connecting points between ribs 7, 8, 9 and upper and/or lower shell 2, 3 where the actuating members 11 to 14 can be hinged in an way advantageous in construction. The crosswise arrangement of actuating members 11 to 14 is not mandatory, so that other geometrical arrangements of actuating members 11 to 14 between upper shell 2 and lower shell 3 can also be chosen.

So that no undesired stresses are created in the rear spar through the actuating operation of the actuating members 11 to 14 and/or through their length variation, the latter must be designed to be "shear flexible" at least in the region of the actuating members 11 to 14.

The term "shear flexible" means that, in the region of the actuating members 11 to 14, the relevant spar cannot absorb or transfer shear stresses 17 to any significant extent. A spar designed to be "shear flexible" substantially only continues to absorb internal pressure loads, e.g. possible fuel loads, as well as transverse forces 19 occurring for instance in an airfoil. However, in the region of the actuating members 11 to 14, shear stresses 17 are substantially absorbed by the actuating members 11 to 14. Upper shell 2 and lower shell 3 absorb regardless of the "shear flexible" design of the spars substantially only the normal stresses 18 that occur.

In addition, it is possible to fit, or possibly even completely replace, at least individual ribs 7, 8, 9 with (rib) actuating members, non shown in FIG. 1 for clarity's sake. These (rib) actuating members are then also arranged crosswise, e.g. substantially in parallel to ribs 7, 8, 9 in the region between upper shell 2 and lower shell 3, so as to form a tension shear field. In case ribs 7, 8, 9 are not to be replaced completely with the (rib) actuating members, then ribs 7, 8, 9 must be designed to be "transverse force flexible" at least in the region of the actuating members. The term "transverse force flexible" means, correspondingly to the term "shear flexibility" introduced above, that e.g. ribs 7, 8, 9 substantially no longer transmit any transverse forces 19 in the region of the (rib) actuating members. At least in those regions where the ribs are designed to be "transverse force flexible", the (rib) actuating members take over the function of the main transmission of the transverse forces 19.

Both spars and ribs can be made at least locally "shear flexible" or "transverse force flexible", e.g. by at least locally introducing beads.

The illustration of FIG. 1 represents a first exemplary embodiment of the invention, wherein merely within a limited section of the rear spar, not shown here for the sake of improved clarity, actuating members 11 to 14 are integrated into the airfoil. The static functions of the rear spar are here taken over only in part by the actuating members 11 to 14 because actuating members 11 to 14 only transfer shear forces. Correspondingly, at least sectionwise, also individual ribs can be fitted with (rib) actuating members. This results in a relatively simpler constructive structure of the wing unit according to the invention.

In contrast to the illustration of FIG. 1, it is also possible to arrange more of the actuating members both at the front spar 10 and at the rear spar, for forming local tension shear fields.

In addition, one exemplary embodiment of the invention provides for the front spar 10 and/or rear spar to be entirely replaced completely by tension shear fields formed by a plurality of actuating members so that a locally "shear flexible" design is no longer relevant. Correspondingly, the ribs of the spar box can also be entirely replaced by actuating members.

In a further embodiment, not shown, of the invention, both the spars and the ribs, e.g. of an airfoil, can be replaced on the entire area by a whole field of length variable actuating members for forming a complex tension shear field. Such a wing unit or such a spar box comprises no spars and no ribs any more. The arrangement of the actuating members is then made at least locally in the form of a matrix in the region between upper shell 2 and lower shell 3, wherein respectively at least two actuating members again being arranged crosswise. this embodiment, by using the actuating members, enables to generate great actuating forces and thus a more extensive modification, of for instance an airfoil formed with this arrangement and/or a highly flexible, dynamic adaptation to different operating and loading states of a plane. For example, it is then possible during the takeoff and landing phase of a plane to provide the airfoils with a surface geometry ensuring maximum lift. In contrast, it would be possible to provide the airfoils during cruise with a surface geometry minimizing drag.

However, such an arrangement implies high constructive and control technical expenditure as a plurality of actuating members are integrated e.g. into the airfoils and driven by the control and regulation device at least partly independent from each other.

Figure 2:
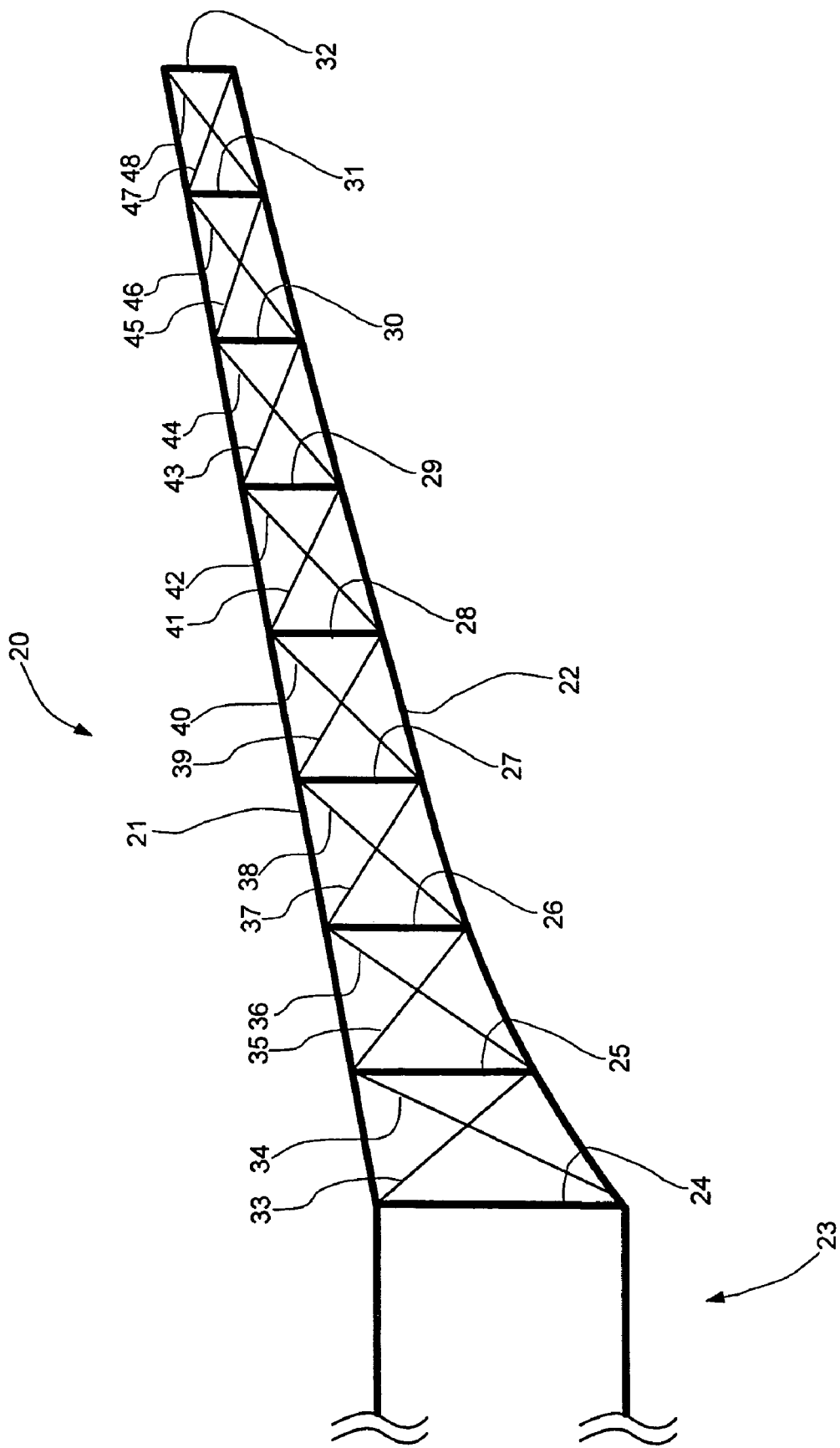
FIG. 2 shows a longitudinal section through a spar box formed with the wing unit according to the invention for an airfoil in accordance with a second exemplary embodiment.

FIG. 2 shows a longitudinal section through a spar box formed with the wing unit according to the invention for an airfoil in accordance with a second exemplary embodiment. In contrast to the first exemplary embodiment, the actuating members here extend over the full length of the airfoil of a plane.

For forming a wing unit for an airfoil of a plane, a spar box 20 comprises amongst other things an upper shell 21 and a lower shell 22. In an area of an airfoil root 23, spar box 20 is connected to a fuselage cell of a plane, not shown in detail. Between upper shell 21 and lower shell 22, ribs 24 to 32 are arranged. In addition, between upper shell 21 and lower shell 22, between two adjacent ribs 24, 25 to 31, 32, respectively two actuating members 33 to 48 are arranged. Herein, actuating members 33 and 34 are arranged crosswise between ribs 24 and 25 in order to allow the highest possible development of force with small actuating distances of actuating members 33 and 34. Between ribs 25 and 26, actuating members 35, 36 etc. through actuating members 47 and 48 are arranged correspondingly between ribs 31 and 32.

Between upper shell 21 and lower shell 22, in turn a rear spar is located, not shown for better clarity, the mechanical action of which is complemented and at the same time enhanced by the tension shear field, formed by actuating members 33 to 48. All actuating members 33 to 48 are formed correspondingly to the previously described actuating members 11 to 14, and can be actuated independently from each other, in particular by the control and regulation device through electrical control signals, i.e. they are formed to be length variable depending on an electrical control voltage applied. In addition, the actuating members 33 to 48, the upper shell 21, the lower shell 22, the ribs 24 to 32, as well as the spars, can comprise sensors, not shown, for generating measuring signals so as to feed the control and regulation device information regarding the loading states currently existing within these components, in particular in the form of length variations and/or mechanical stresses. The tension shear field formed by the actuating members 33 to 48 in turn is for dynamically adapting the spar box 20 to different operating and loading states of the airfoil of the plane.

The mechanical function of the rear spar can either be merely complemented and/or enhanced by the actuating members 33 to 48, or else even entirely replaced thereby. In case of merely complementing and/or enhancing the static functionality of the rear spar through the actuating members 33 to 48, the spar is designed to be "shear flexible" so as to avoid undesired mechanical stresses due to actuating and/or operating of the tension shear field.

Figure 3:
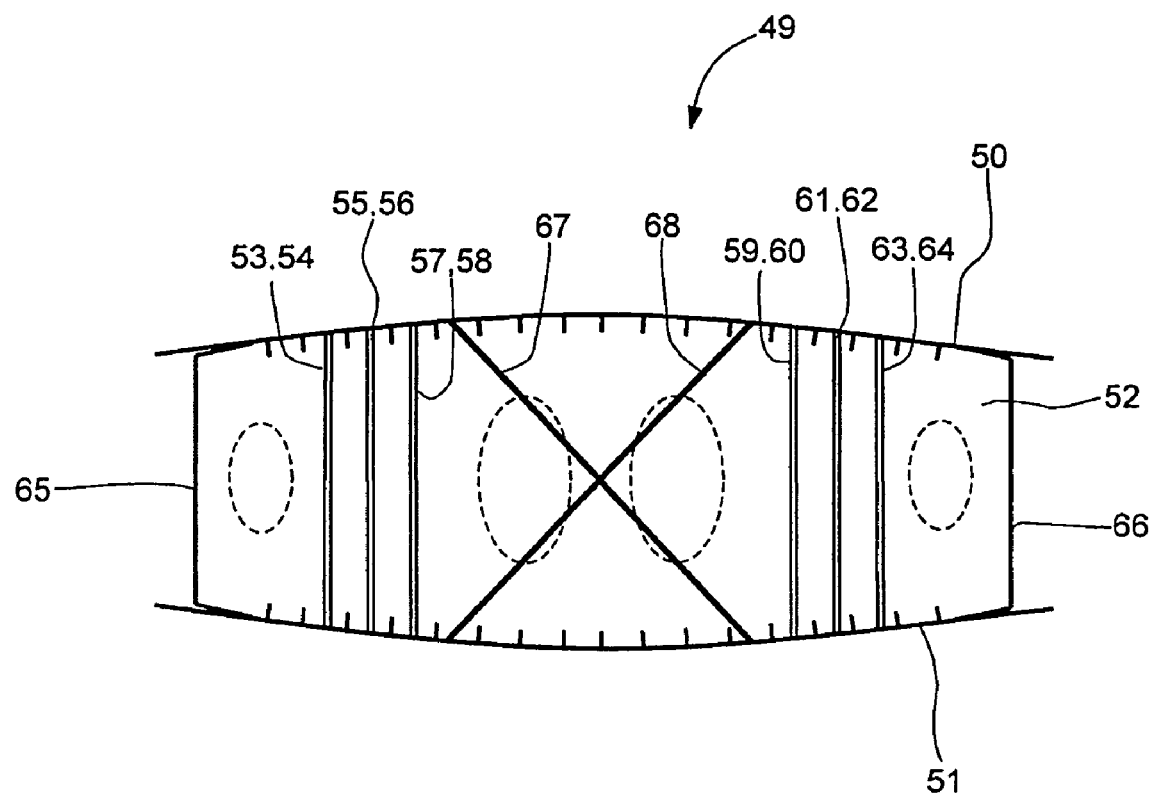
FIG. 3 shows a cross-section through a spar box according to a third exemplary embodiment.

FIG. 3 shows a cross-section through a spar box formed with a wing unit, in accordance with a third, exemplary embodiment. In contrast to the second exemplary embodiment, between two ribs, respectively twelve actuating members are provided. Herein, in each case two actuating members, are again arranged crosswise. Moreover, another two (rib) actuating members, arranged crosswise, are provided.

For forming a wing unit for an airfoil of a plane, a spar box 49 comprises amongst other things an upper shell 50 and a lower shell 51. Upper shell 50 and lower shell 51 are connected together through rib 52. On the inner sides of the upper and lower shells 50, 51, a plurality of stringers, indicated by small vertical lines, are arranged in uniformly spaced relation. In addition, between upper shell 50 and lower shell 51, a total of twelve actuating members 53 to 64 are arranged. Respectively two of the actuating members 53 to 64 are again arranged crosswise between upper shell 50 and lower shell 51.

In addition, spar box 49 comprises a front spar 65 and a rear spar 66. The mechanical functions of the front and rear spars 65, 66 are taken over at least in part by actuating members 53 to 64, and/or they complement these functions. In order to avoid the undesired creation of shear stresses, when the actuating members 53 to 64 are operated, within the front and rear spars 65, 66, the latter are again designed to be "shear flexible".

In addition, spar box 49 comprises two actuating members 67, 68, which complement and/or enhance at least partly the mechanical function of rib 52. In order to avoid the creation of undesired transverse forces in rib 52 when the actuating members 67, 68 are operated, rib 52 is designed to be "transverse force flexible". Herein, the structure of the actuating members 53 to 64 and 67, 68 corresponds to the constructive structure of the actuating members 11 to 14 described above with reference to FIG. 1.

Unlike the arrangement in the illustration of FIG. 3, with adequate design of the actuating members, the static functions of front spar 65, rear spar 66, as well as rib 52, can be taken over entirely by the actuating members 53 to 64 and 67, 68. This principle can be applied to the whole length of an airfoil, a horizontal tail unit, or a rudder unit, when a sufficient amount of adequately arranged actuating members are provided.

By the wing unit according to the invention and the spar boxes formed thereof, aerodynamically active surfaces can be formed that adapt dynamically to a plurality of different flight states. This results in aerodynamic improvements by a surface geometry of the aerodynamically active surfaces, adapted to the respective operating states of the plane by the actuating members, and/or weight savings due to a reduction of structural mechanical loads.

It should be noted that the term "comprising" does not exclude other elements or steps and the "a" or "an" does bot exclude a plurality. Also elements described in association with different embodiments may be combined. It should also be noted that reference signs in the claims shall not be construed as limiting the scope of the claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE LIST 1 spar box
2 upper shell
3 lower shell
4 stringer
5 stringer
6 stringer
7 rib
8 rib
9 rib
10 spar
11 actuating member
12 actuating member
13 actuating member
14 actuating member
15 upper rib feet
16 lower rib feet
17 shear stresses
18 normal stresses
19 transverse forces
20 spar box
21 upper shell
22 lower shell
23 airfoil root
24 rib
25 rib
26 rib
27 rib
28 rib
29 rib
30 rib
31 rib
32 rib
33 actuating member
34 actuating member
35 actuating member
36 actuating member
37 actuating member
38 actuating member
39 actuating member
40 actuating member
41 actuating member
42 actuating member
43 actuating member
44 actuating member
45 actuating member
46 actuating member
47 actuating member
48 actuating member
49 spar box
50 upper shell
51 lower shell
52 rib
53 actuating member
54 actuating member
55 actuating member
56 actuating member
57 actuating member
58 actuating member
59 actuating member
60 actuating member
61 actuating member
62 actuating member
63 actuating member
64 actuating member
65 spar
66 spar
67 actuating member
68 actuating member

The invention claimed is:

1. A wing unit, in particular a spar box, for forming an aerodynamically active surface of an aircraft, in particular airfoils, horizontal tail units, or rudder units of a plane, comprising:
   an upper shell and a lower shell, the upper shell and the lower shell forming the aerodynamically active surface;
   at least two ribs;
   at least two actuating members; and
   at least two spars;
   wherein in a region between the upper shell and the lower shell the at least two actuating members are arranged for modifying the surface geometry of the aerodynamically active surface or the mechanical properties of the wing unit, or both the surface geometry of the aerodynamically active surface and the mechanical properties of the wing unit;
   wherein between the at least two ribs, the at least two actuating members are arranged crosswise for forming a tension shear; and
   wherein the at least two actuating members are arranged substantially in parallel to the at least two spars.

2. The wing unit according to claim 1, wherein the at least two actuating members are adapted in such a way that a surface geometry of an aerodynamically active surface is changeable by using a control and regulation device, depending on loading states prevailing in the wing unit.

3. The wing unit according to claim 2 further comprising a control and regulation device associated with at least one of the at least two actuating members to change the surface geometry at the aerodynamically active surface depending on loading status prevailing in the wing unit.

4. The wing unit according to claim 3 further comprising a bending/torsion coupling associated with at least one of the at least two actuating members.

5. The wing unit according to claim 1, wherein the at least two actuating members are adapted in such a way that a bending/torsion coupling of the wing unit is changeable by a control and regulation device, depending on the loading states prevailing in the wing unit.

6. The wing unit according to claim 1, wherein at least one spar is arranged between the upper shell and the lower shell.

7. The wing unit according to claim 6, wherein the at least one spar is shear flexible in the region of at least one of the at least two actuating members.

8. The wing unit according to claim 1, wherein at least one rib is arranged between the upper shell and the lower shell.

9. The wing unit according to claim 8, wherein the at least one rib is transverse force flexible in the region of at least one of the at least two actuating members.

10. The wing unit according to claim 1, wherein a dimension of the at least two actuating members is variable by a control and regulation device.

11. The wing unit according to claim 1, further comprising two ribs and a spar, wherein the two ribs are arranged between the upper shell and the lower shell, wherein the spar is arranged between the upper shell and the lower shell, wherein between the two ribs at least one of the at least two actuating members is arranged, and wherein at least one of the at least two actuating members is arranged substantially in parallel to the spar.

12. The wing unit according to claim 1, further comprising: a rib, wherein the rib is arranged between the upper shell and the lower shell, wherein that at least one actuating member is arranged substantially parallel to the rib in the region between the upper shell and the lower shell.

13. The wing unit according to claim 1, further comprising: at least two actuating members; and at least one rib; wherein the rib is arranged between the upper shell and the lower shell; and wherein the at least two actuating members are arranged crosswise to each other substantially in parallel to the at least one rib for forming a tension shear field.

14. The wing unit according to claim 1, wherein at least one of the at least two actuating members is rod-shaped.

15. The wing unit according to claim 1, wherein at least one of the at least two actuating members comprise at least one actuator, wherein the at least one actuator is adapted to vary a length of the at least one actuating member.

16. The wing unit according to claim 15, wherein the at least one actuator is formed with at least one piezoelectric element selected from the group consisting of particular piezoelectric stacks, piezoelectric plates, and piezoelectric filaments with at least one shape memory element, wherein the at least one piezoelectric element is adapted in such a way that it is operateable through control signals generated by a control and regulation device.

17. The wing unit according to claim 16, wherein the control signals for the at least one actuator are electrical voltages or electrical currents, or both electrical voltages and electrical currents.

18. The wing unit according to claim 1, wherein at least one of the at least two actuating members comprises at least one sensor, wherein the at least one sensor is adapted to detect loading states in the at least one actuating member or a length variation of the at least one actuating member, or both loading states in the at least one actuating member and a length variation of the at least one actuating member.

19. The wing unit according to claim 1, further comprising at least one sensor, wherein the at least one sensor is arranged in a region of the upper shell, the lower shell, at least one of the at least two spars, as well as at least one of the at least two ribs, wherein the at least one sensor is adapted to detect at least one loading state or at least one length variation, or both at least one loading state and at least one length variation in the region of the upper shell, the lower shell, or at least one of the at least two spars, as well as of at least one of the at least two ribs.

20. The wing unit according to claim 19, wherein the at least one sensor is formed with at least one piezoelectric element, in particular piezoelectric stacks, piezoelectric plates, piezoelectric filaments, or strain gauges.

21. A wing unit, in particular a spar box, for forming aerodynamically active surfaces of an aircraft, in particular airfoils, horizontal tail units, or rudder units of a plane, comprising:
an upper shell and a lower shell, the upper shell and the lower shell forming the aerodynamically active surface;
a first rib having a lower rib foot and an upper rib foot;
a second rib having a lower rib foot and an upper rib foot; and
at least two actuating members;
wherein the at least two actuating members are arranged in a region between the upper shell and the lower shell for modifying the surface geometry of the aerodynamically active surface or the mechanical properties of the wing unit or both the surface geometry of the aerodynamically active surface and the mechanical properties of the wing unit;
wherein the at least two actuating members are arranged crosswise;
wherein one of the at least two actuating members is arranged between the lower rib foot of the first rib and the upper rib foot of the second rib; and
wherein the other one of the at least two actuating members is arranged between the upper rib foot of the first rib and the lower rib foot of the second rib.

22. The wing unit according to claim 21, wherein the at least two actuating members are adapted in such a way that a surface geometry of an aerodynamically active surface is changeable by using a control and regulation device, depending on loading states prevailing in the wing unit.

23. The wing unit according to claim 22 further comprising a control and regulation device associated with at least one of the at least two actuating members to change the surface geometry at the aerodynamically active surface depending on loading status prevailing in the wing unit.

24. The wing unit according to claim 23 further comprising a bending/torsion coupling associated with at least one of the at least two actuating members.

25. The wing unit according to claim 21, wherein the at least two actuating members are adapted in such a way that a bending/torsion coupling of the wing unit is changeable by a control and regulation device, depending on the loading states prevailing in the wing unit.

26. The wing unit according to claim 21, wherein at least one spar is arranged between the upper shell and the lower shell.

27. The wing unit according to claim 26, wherein the at least one spar is shear flexible in the region of at least one of the at least two actuating members.

28. The wing unit according to claim 21, wherein at least one rib is arranged between the upper shell and the lower shell.

29. The wing unit according to claim 28, wherein the at least one rib is transverse force flexible in the region of at least one of the at least two actuating members.

30. The wing unit according to claim 21, wherein a dimension of the at least two actuating members is variable by a control and regulation device.

31. The wing unit according to claim 21, further comprising two ribs and a spar, wherein the two ribs are arranged between the upper shell and the lower shell, wherein the spar is arranged between the upper shell and the lower shell, wherein between the two ribs at least one of the at least two actuating members is arranged, and wherein at least one of the at least two actuating members is arranged substantially in parallel to the spar.

32. The wing unit according to claim 21, wherein at least one of the first or second ribs is arranged between the upper shell and the lower shell, and wherein at least one of the at least two actuating members is arranged substantially parallel to the at least one rib in the region between the upper shell and the lower shell.

33. The wing unit according to claim 21, wherein at least one of the first or second ribs is arranged between the upper shell and the lower shell, and wherein the at least two actuating members are arranged crosswise to each other substantially in parallel to the at least one rib for forming a tension shear field.

34. The wing unit according to claim 21, wherein at least one of the at least two actuating members is rod-shaped.

35. The wing unit according to claim 21, wherein at least one of the at least two actuating members comprise at least one actuator, wherein the at least one actuator is adapted to vary a length of the at least one actuating member.

36. The wing unit according to claim 35, wherein the at least one actuator is formed with at least one piezoelectric element selected from the group consisting of particular piezoelectric stacks, piezoelectric plates, and piezoelectric filaments with at least one shape memory element, wherein the at least one piezoelectric element is adapted in such a way that it is operateable through control signals generated by a control and regulation device.

37. The wing unit according to claim 36, wherein the control signals for the at least one actuator are electrical voltages or electrical currents, or both electrical voltages and electrical currents.

38. The wing unit according to claim 21, wherein at least one of the at least two actuating members comprises at least one sensor, wherein the at least one sensor is adapted to detect loading states in the at least one actuating member or a length variation of the at least one actuating member, or both loading states in the at least one actuating member and a length variation of the at least one actuating member.

* * * * *